Figure 1:
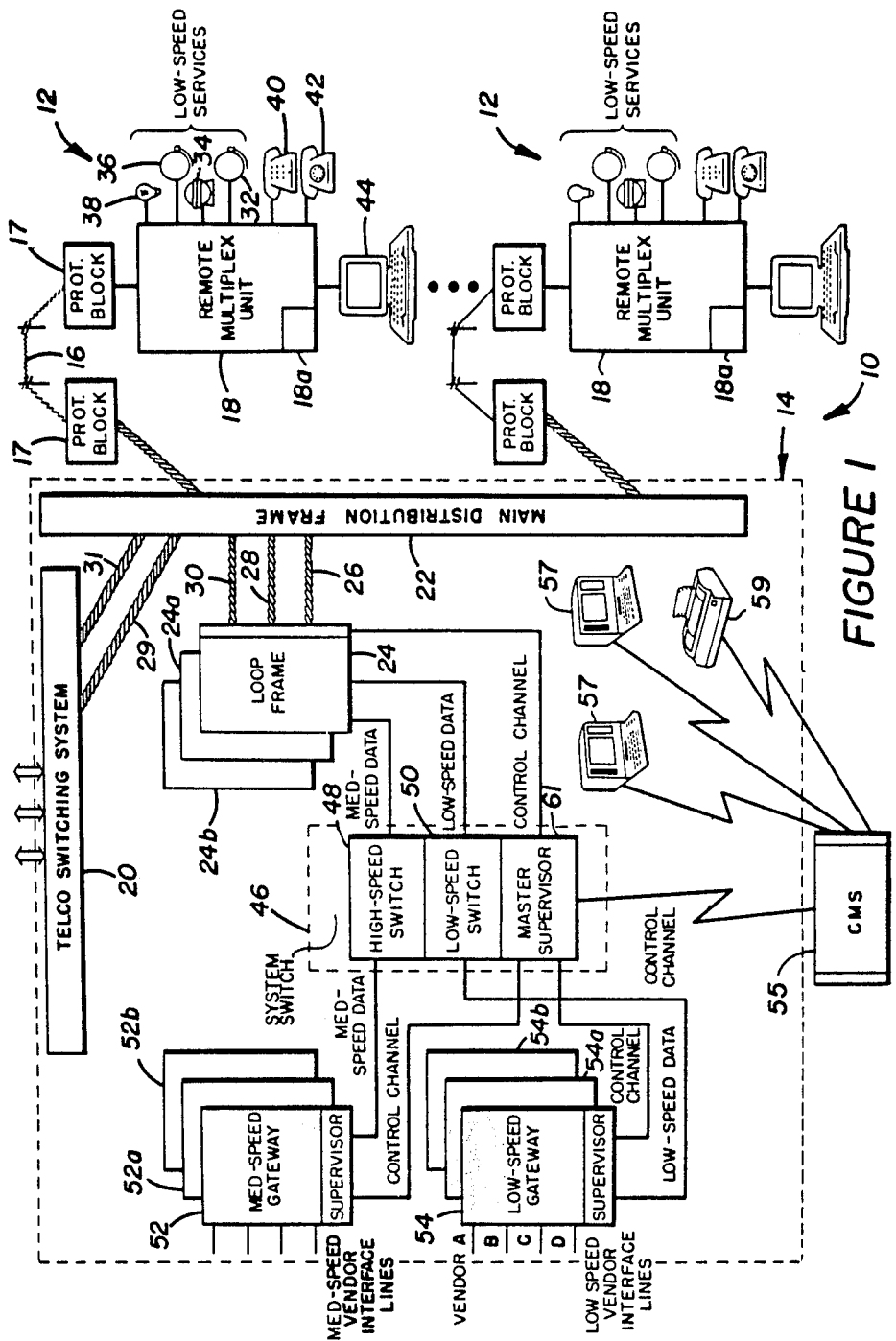

United States Patent [19]

Carse et al.

[11] Patent Number: 4,750,169

[45] Date of Patent: Jun. 7, 1988

[54] TELEPHONE SYSTEM AND METHOD FOR TRANSMITTING DIGITAL INFORMATION

[75] Inventors: Gregg D. Carse, Mountain View; Bernard N. Daines, Union City, both of Calif.

[73] Assignee: Pacific Bell, San Francisco, Calif.

[21] Appl. No.: 838,579

[22] Filed: Mar. 11, 1986

Related U.S. Application Data

[63] Continuation-in-part of Ser. No. 711,088, Mar. 12, 1985, abandoned.

[51] Int. Cl.$^4$ .............................................. H04J 3/12
[52] U.S. Cl. ................................. 370/109; 370/110.1; 370/29
[58] Field of Search ................... 370/109, 110.1, 29, 370/24

[56] References Cited

U.S. PATENT DOCUMENTS

| | | | |
|---|---|---|---|
| 4,174,465 | 11/1979 | Meares et al. | 370/109 |
| 4,267,592 | 5/1981 | Graiglow | 370/109 |
| 4,332,980 | 6/1982 | Reynolds et al. | |
| 4,394,757 | 7/1983 | Mazumdar et al. | 370/110.1 |
| 4,467,473 | 8/1984 | Arnon et al. | 370/109 |
| 4,476,558 | 10/1984 | Arnon | |

Primary Examiner—Douglas W. Olms
Assistant Examiner—Wellington Chin
Attorney, Agent, or Firm—Fitch, Even, Tabin & Flannery

[57] ABSTRACT

A telephone system is described wherein a plurality of subscriber locations are each connected to a central office by a single subscriber loop. A signalling method is used for transmitting information between each subscriber location and a cental office. Bursts of time compressed multiplexed full duplex digital signals are synchronously transmitted at an information bit rate of between about forty and eighty kilobits per second and at a burst cycle of between about 0.8 and 4.0 milliseconds. Each of the bursts is comprised of bits defining at least one voice channel, at least one data channel, and at least one signalling channel, with at least one synchronizing bit at the front and back of each burst.

10 Claims, 2 Drawing Sheets

TELEPHONE SYSTEM AND METHOD FOR TRANSMITTING DIGITAL INFORMATION

This invention is a continuation-in-part of U.S. Ser. No. 711,088, filed Mar. 12, 1985, now abandoned.

This invention relates generally to telephone systems and, more particularly, to telephone systems wherein a plurality of subscriber locations are each connected to a central office by a single subscriber loop. The invention comprises improvements in signalling methods and systems for transmitting information between each subscriber location and a central office.

Telephone systems in the United States and in many other countries were originally designed solely for the transmission of analog voice signals between subscriber locations and a central office. At the central office, signals from and to the various subscriber loop locations are handled by suitable switching systems. Connection between the central office and each subscriber location is typically by means of a single subscriber loop—usually a twisted pair of insulated copper wires.

With the coming of the "information age," telephone companies have sought ways to increase the level of service to their subscribers. One way of doing this is to increase the capacity of subscriber-to-central office communication by adding subscriber loops. As one might imagine, however, the cost of installing additional subscriber loops in an existing telephone system for all subscribers is prohibitive.

Many telephone companies have, accordingly, explored the use of digital signalling techniques along with multiplexing in order to transmit more information into signals traveling between subscribers and the central office. Since digital transmission techniques via microwave and other long distance signalling systems are already employed, and in as much as digital switching is utilized in many modernized central offices, the digitizing of the subscriber loop affords evident advantages. Nevertheless, although the prior art is replete with various approaches to the subscriber loop digitization problem, the difficulties thus far encountered have prevented practical commercial fulfillment of this objective.

By way of example, a bidirectional subscriber loop transmission system is described by Soejima, et al., "Experimental Bidirectional Subscriber Loop Transmission System," IEEE Transactions on Communications, Vol. Com-30, No. 9, September 1982. This system is based on a time compression burst mode transmission scheme (ping-pong), and provides two information channels and a signalling channel. In this, and other similar systems, however, serious problems are encountered in achieving sufficient transmission quality over the distances usually encountered in connection with subscriber service. Such problems include cross talk, echoing as a result of discontinuities and taps in the line, and the natural attenuation of high frequency signals with transmission distance.

Other difficulties arise in connection with the combining of voice information with data. The data may take the form of relatively high speed data such as that utilized by a computer terminal, or relatively low speed data such as alarms or medical or police alert functions. By way of example, U.S. Pat. No. 4,476,558, to Arnon describes a digital transmission signal system employing time compression multiplexing in which burst mode or ping-pong transmission is utilized. However, only voice information is transmitted and there is no successful combination of voice and data in this system. In another example, U.S. Pat. No. 4,332,980, transmission of both voice and data is described. However, in this system, a "voice over data" technique is utilized wherein the voice information remains in analog form and wherein the data transmission is transmitted at a different and supposedly noninterfering frequency.

Nowhere in the prior art is there a teaching of a transmission method and system capable of handling both voice and data in digitized format which can be successfully applied to typical existing telephone subscriber systems. Either the capacity for handling the voice and data information is inadequate, or the transmission quality and distance is insufficient for commercial application, or both. The problems created by typical irregularities in subscriber loops resulting from discontinuities, bridge taps, variations in image size, oxidation, etc. create unacceptable distortion. Cross talk between the various data channels is in many cases unacceptable. Transmission distance to adequately serve typical subscriber locations is therefore frequently not achieved. Moreover, the quality of voice information is often unacceptable.

Accordingly, it is an object of the present invention to provide an improved telephone system of the type wherein a plurality of subscriber locations are each connected to a central office by a single subscriber loop.

A further object of the invention is to provide an improved telephone system of the type described wherein at least one voice channel, at least one data channel, and at least one signalling channel is provided for the subscriber.

Another object of the invention is to provide an improved telephone system of the type described wherein high quality signals are achieved at transmission distances up to and exceeding six kilometers.

Another object of the invention is to provide an improved telephone system of the type described wherein the effect of cross talk and line irregularities are minimized.

Figure 2:
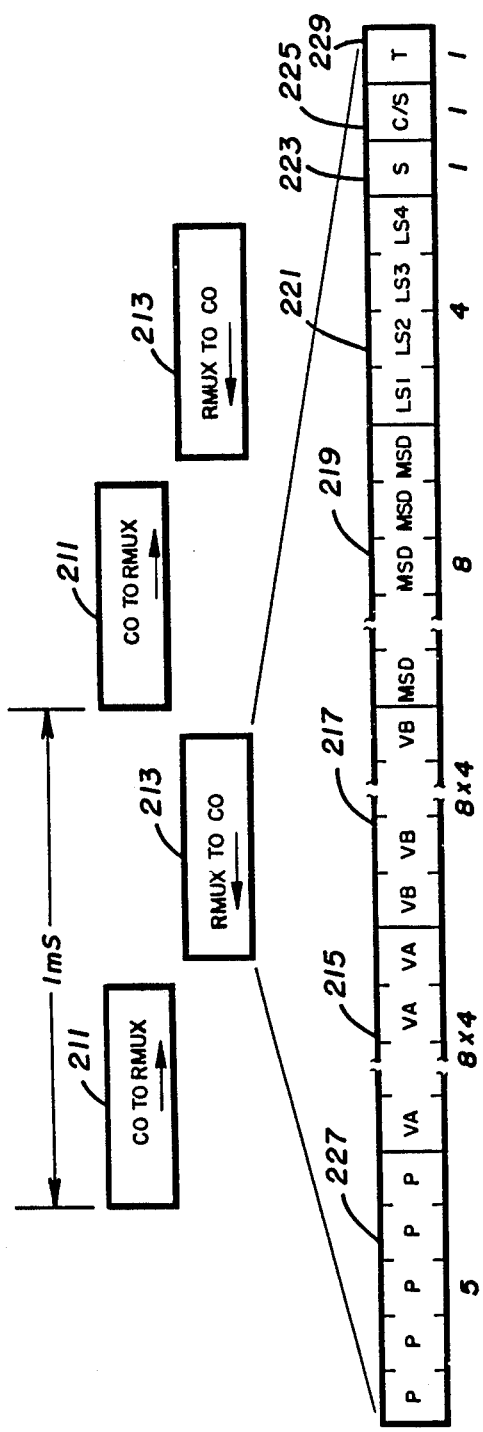

Other objects of the invention will become apparent to those skilled in the art from the following description, taken in connection with the accompanying drawings wherein:

FIG. 1 is a block diagram of a typical telephone system in which the method and apparatus of the invention may be employed; and FIG. 2 is a schematic representation of the signal format preferred in the method and apparatus of the invention.

Very generally, the telephone system to which the method and apparatus are applied includes a plurality of subscriber locations, each connected to a central office by a single subscriber loop. Information is transmitted between each subscriber location and the central office by full duplex transmission of bursts of time compressed multiplexed digital signals. Each burst comprises bits defining at least one voice channel, at least one data channel, and at least one signalling channel. At least one synchronizing bit is placed at the front and back of each burst. The bursts for each duplex are transmitted from the central office simultaneously, and the departure times of the bursts from each of the subscriber locations for each duplex are such that the bursts arrive at the central office substantially simultaneously.

As used in this specification and claims, the following terms have the following definitions:

Time compression multiplex (TCM) means the transmission of digital information in discrete portions which are compressed in time to form a so called "burst" which occupies less than one half the time of the original portion. In operation, the transmitter transmits a burst along the transmission path to a receiver which then expands the received burst to occupy its original time span. After transmission of a burst in one direction, a second burst is transmitted in the other direction between a second transmitter-receiver pair. The net result is that the system appears to be transmitting information simultaneously in both directions.

Full duplex transmission means TCM transmission of bursts alternately in each of two directions as described above so as to create the effect of transmission in both directions simultaneously.

Information bit rate means the total number of bits containing information transmitted in one direction per unit time.

Burst cycle means a set of contiguous digital signals, before and after which there is a period of no signals.

Burst cycle means the period of time during which a first burst is transmitted in one direction and a second burst is transmitted in the other direction. This total time period includes the length of each duplex burst plus the so called turn around time between bursts, during which there is no signal.

Voice channel means a portion of transmitted digital signals which encodes voice information and which may be reconstituted as audible voice information.

Data channel means a portion of transmitted digital signals containing data information and which may be reconstituted as data information, such information being computer signals, alarm signals, emergency call signals, and the like.

Signalling channel means a portion of transmitted digital signals containing signalling information such as is used for bell ringing and hook on or off determination in a telephone system.

Synchronous means the transmission of bursts of digital signals controlled by clock pulses or the like.

Synchronous bits means transmitted digital signals, typically at the front and back and or both ends of bursts, for providing synchronizing information for asynchronous transmission.

Asynchronous means the transmission of burst of digital signals, the start of each of which is related to or generated by the completion of a previously transmitted burst.

In FIG. 1, a preferred form of a telephone system employing the invention is illustrated. The invention, however, is not limited to use in the particular system shown in FIG. 1, but is applicable to any type of telephone system wherein a plurality of subscriber locations are each connected to a central office by a single subscriber loop.

Referring now to FIG. 1, there is shown a telephone system 10 constructed in accordance with the principles of the present invention. The telephone system 10 connects a plurality of subscriber locations, such as the subscriber location 12, to a central office 14. A single subscriber loop 16, also known as a twisted pair, electrically connects each subscriber location 12 to the central office 14. Distributed along each subscriber loop 16 are one or more protection blocks 17. In a preferred embodiment of the present invention, one protection block 17 is located at the central office end of the subscriber loop 16 and another protection block 17 is located at the subscriber location end of the subscriber loop 16. The protection blocks 17 electrically protect the central office circuitry and subscriber equipment from voltage spikes and surges occurring along the subscriber loop 16. Such voltage spikes and surges are typically caused by lighting and other electrical interferences.

Located at each subscriber location 12, wherein services contemplated by the present invention are desired, is a remote multiplexer unit 18 which provides the interface for connection of subscriber equipment to the telephone system 10. In a preferred embodiment of the present invention, the unit 18 supports the following input-output (I/O) connections for subscriber equipment:

(1) two standard 500 series compatible phone connections or voiceband data modem connections;

(2) one medium speed asynchronous modemless data connection; and (3) four low speed asynchronous data connections for telemetry applications.

Since the preferred embodiment of the present invention is intended to utilize as much pre-existing telephone equipment as possible, the unit 18 preferably uses standard cable and connectors for subscriber owned equipment. Thus, in the preferred form for the Northern California service area, the 500 series compatible phone connections are standard RJ-11 connectors, and the medium speed asynchronous modemless data connection and the four low speed asynchronous modemless data connections are through an eight pin RJ-41 connector. Of course, it would be within the level of ordinary skill to provide a remote multiplexer unit which would support other combinations of subscriber owned equipment and connectors.

Generally, the unit 18 digitally encodes, multiplexes and transmits the voice signals and data signals applied to the above described connections to the central office 14 over the subscriber loop 16. Conversely, the unit 18 demultiplexes and decodes the digital information received from the central office 14 over the subscriber loop 16 and delivers the decoded voice signals and decoded data signals to the appropriate subscriber equipment.

The remote multiplexer unit 18 as shown in FIG. 1 includes means for encoding low speed data signals from sources of low speed data signals such as the low speed services 32, 34, 36 and 38. The unit 18 also includes means for encoding the voice signals from a source of voice signals such as indicated by the telephones 40 and 42, and means for encoding medium speed data signals from a source of data signals such as a computer 44.

According to the present invention, no assumptions are made about the format of the encoding of the data applied to the low speed data channels. Inputs to these channels are wired as dedicated paths to various vendor services such as intruder detection and control, as indicated by the alarm 32; power monitoring, as indicated by electric meter 34; automatic notification of emergency services, as indicated by fire alarm 36; and an energy management system as indicated by the light bulb 38.

The encoding performed by the unit 18 develops a plurality of successive frames. Each of the frames has first voice bits encoding the voice signals from the telephone 40 and second voice bits encoding voice signals from the telephone 42. Each frame also includes at least one data bit encoding the data signal for each of the associated one of low speed services 32–38 and a plurality of medium speed data bits encoding the data signals from the computer 44. The subscriber unit 18 further includes means for transmitting the successive frames from each unit 18 on the subscriber loop 16 associated therewith. The timing of the bursts transmitted by each unit 18 is controlled by an interval timing unit 18a.

The central office 14 includes a telephone company switching system 20, which may be either an analog or digital switching system, and a conventional main distribution frame 22. Each subscriber loop 16 is terminated at the central office 14 at the main distribution frame 22. For those subscriber locations having ordinary telephone service, i.e. which do not have a remote multiplexer unit 18, the main distribution frame 22 connects the subscriber loop for ordinary telephone service directly to the telephone company switching system 20 through a twisted pair (not shown). However, those subscriber locations, such as the subscriber location 12, which have a unit 18, the main distribution frame 22 connects the subscriber loop 16 to a loop frame 24 by a twisted pair 26 associated with each subscriber loop 16. Thus, for each subscriber loop 16, there is one twisted pair 26 connecting such subscriber loop 16 to the loop frame 24.

Generally, the loop frame 24 demultiplexes the digital information transmitted by each unit 18 along its associated subscriber loop 16, separating the information into digital voice, medium speed data, and low speed data. Since in the preferred form each unit 18 encodes two voice band channels, for each twisted pair 26 connected to the loop frame 24, there is provided a first output twisted pair 28 and a second output twisted pair 30 from the loop frame 24. Each output twisted pair 28 and 30 electrically couples the loop frame 24 back to the main distribution frame 22, and each carries one digital voice channel. For each twisted pair 28 coupled between the loop frame 24 and the main distribution frame 22, there is an associated twisted pair 29 electrically coupled between the main distribution frame 22 and the telephone company switching system 20. Similarly, for each twisted pair 30, there is an associated twisted pair 31. The loop frame 24 applies the first channel voice content and the second channel voice content in the demultiplexed digital information from the subscribed loop 16 to the first output twisted pair 28 and the second output twisted pair 30, respectively. The main distribution frame 22 couples the first voice channel to the telephone company switching system 20 over the twisted pair 29, and the second voice channel to the telephone company switching system over the twisted pair 31.

The telephone company switching system 20 switches the first voice channel and the second voice channel to the respective intended recipient. In the situation where the central office switching system 20 is a digital switch, an interface (not shown) may be used to place the digital voice data on the twisted pairs 29 and 31 into the format used by the digital switching system. Where the central office switching system 20 is an analog switch, a suitable digital to analog converter (not shown) may be used to appropriately convert the signals on the twisted pairs 29 and 31 for switching. Of course, for signals passing in the opposite direction, converse adjustment of the signals is utilized.

The loop frame 24 is further responsive to the successive frames on all subscriber loops 16 for multiplexing the medium speed data bits in all frames into a medium speed data stream and multiplexing the low speed data bits in all frames into a low speed data stream.

In a preferred embodiment of the present invention, each central office 14 includes a plurality of loop frames, each similar to the loop frame 24. For example, two further loop frames 24a and 24b are illustrated in FIG. 1. However, the central office 14 may include any number of loop frames, which number depends upon the number of subscriber loops connected to the central office and the number of such loops supported by each loop frame. For example, a typical central office may include twelve loop frames, wherein each loop frame supports four hundred eighty subscriber loops.

According to the present invention, added to the telephone company central office 14 is a system switch or master frame 46 which receives the medium speed data stream and the low speed data stream from all loop frames 24, 24a and 24b. The system switch 46 includes a medium speed switch 48 which demultiplexes and sorts the medium speed data stream from each loop frame 24, 24a and 24b and remultiplexes the medium speed data into a plurality of time division multiplexed data signals. Each of the medium speed multiplexed data signals developed by the medium speed switch 48 are applied to an associated one of medium speed gateways 52, 52a and 52b. The medium speed gateways demultiplex the medium speed multiplexed data signals applied thereto into the respective medium speed data signals originally applied to the various units 18 and route such data signals to an intended data services vendor interface, such as a packet switching network PAD (packet assembler/disassembler).

The system switch 46 further includes a low speed switch 50 which demultiplexes and sorts the low speed data stream from each loop frame 24, 24a and 24b and remultiplexes the low speed data into a plurality of low speed time division multiplexed signals. Each of the low speed multiplexed data signals developed by the low speed switch 50 are applied to an associated one of low speed gateways 54, 54a and 54b which demultiplex the low speed multiplexed data signals applied thereto into the respective low speed data signals originally applied to the units 18. These signals are then routed to a corresponding low speed data service vendor.

As is the case in any telephone system, provision is made for the control and management of the switching of the various packets of information passing in and out of the central office. In the embodiment illustrated in FIG. 1, it is assumed that the control and management of the telco switching system 20 is accomplished by means conventionally employed in telephone switching systems. However, it is within the scope of the present invention to include means for switching voice information within the system switch. In such a case, control and management of the voice switching would be generally the same as that of the medium speed switch 48.

In order to provide the control and management function, the control and management system (CMS) unit 55 is provided. The CMS unit 55 includes a plurality of data input terminals 57 for altering and updating the control function as needed. Information output means, such as the printer 59 are also provided in order to produce a suitable written record of the time and duration of various calls for billing purposes and other management functions.

Control messages from the CMS unit 55 are applied to the system switch through a suitable control channel. The messages are received by the master supervisor 61 located in the system switch 46. The master supervisor 61 transmits control information to appropriate supervisors located within the switches 48 and 50. Such communication may be, for example, over multiplex channels on the same TDM buses used for interchange of voice and/or data signals. Information from the master supervisor 61 also functions to transmit all necessary control information received from the switches 48 and 50 to the CMS 55. Suitable supervisor units for the medium speed switch 48 and low speed switch 50, and if desired, for a voice switch within the system switch 46, may be of any appropriate design. Such supervisory functions typically comprise microprocessors suitably programmed and mounted within or adjacent the switch hardware.

Referring now to FIG. 2, a schematic diagram of the transmission technique of the invention is set forth. The blocks 211 represent the synchronously transmitted bursts of time compressed multiplexed digital signals transmitted from the central office (CO) to a particular remote multiplexer unit (RMUX) on a subscriber loop. Similar bursts, represented by the blocks 213, are synchronously transmitted in the opposite direction, as indicated by the arrows within the blocks. The transmission procedure, sometimes known as ping-pong, transmits a burst 211 from the central office to a remote multiplexer unit, followed by transmission of a burst 213 from a remote multiplexer unit to the central office. It is preferred that the bursts alternate directions. However, several bursts may be transmitted in each direction and then several bursts may be transmitted in the opposite direction without departing from the scope of the invention. It will be noted that between bursts which move in opposite directions, a time interval or guard time is provided during which there is no signal. The guard time compensates for propagation delays along the subscriber loop 16 and secondarily permits the line to clear of any residual signals or transients caused by inductance or capacitance inherent in the loop.

Transmission over the subscriber loop is accomplished by suitable transceivers (transmitter/receiver) located at each end of the loop. The transceiver at the central office is the master (e.g. it sends the "Pings") and the transceiver in the subscriber unit is the slave (e.g. it sends the "Pongs"). The timing in the remote multiplexer units governed by the interval timing units 18a is preferably derived from the central office burst frequency. Each transceiver continuously transmits at the same frequency, even when none of the voice or data channels are in use.

The result of the foregoing alternating direction, or ping-pong transmission, is a full duplex signal giving the external appearance that information is being simultaneously transmitted both from the central office to the subscriber unit and from the subscriber unit to the central office. Such transmission, known as time compressed multiplexed full duplex digital transmission, may be achieved by a variety of means well known to those skilled in the art. For example, the transmission and reception of the information may be achieved by the means shown and described in co-pending U.S. patent application Ser. No. 838,571, filed of even date herewith.

In order to be practical and commercially attractive for most existing telephone systems of the type to which the invention applies, transmission of a signal of satisfactory quality over a distance of about six kilometers is required. Too high a transmission frequency results in rapid signal attenuation such that the required transmission distance is not achievable with adequate signal quality. Use of a stronger signal to offset this often results in excessive crosstalk. Too low a frequency, on the other hand, makes it impractical to provide enough additional information in the signal so as to make conversion from the existing analog approach worthwhile. Although many digital telephone systems have been proposed, sometimes generally referred to as ISDN (integrated services digital network), the need to include several services in the signal has resulted in proposed burst lengths in excess of 140 bits. For an accepted satisfactory voice transmission quality, a sampling time of 8000 samples per second is standard. Proposed ISDN systems therefore, typically require a transmission frequency of well in excess of 300 kilobits per second. Experience has shown that considerable difficulty is encountered at such frequencies in achieving quality signal transmission for satisfactory distances. This is due in part to normal signal attenuation, in part to near-end and far-end crosstalk problems, and in part to a combination of these and other factors.

In accordance with the present invention, it has been discovered that satisfactory transmission distance and information content may be achieved in an ISDN type system using full duplex digital signals transmitted at an information bit rate of between about forty and eighty kilobits per second. The burst cycle utilized may be between about 0.8 and about 4.0 milliseconds. Within these parameters, it has been discovered that a satisfactory amount of information can be contained within the signals and that satisfactory quality can be achieved at transmission distances up to and exceeding six kilometers. As the term is used herein, "information bits" do not include bits devoted to signalling such as "ring" and "hook on-off" information, nor do information bits include those bits utilized for synchronizing the bursts when they are later transmitted asynchronously.

Using TCM transmission, the "effective" data rate requires an actual line rate or bit burst rate of twice the required data bandwidth. The actual bit rate required depends on the number of bits in a burst and the guard time between bursts. Thus, in the preferred embodiment, the total bit rate is roughly 200 Kbits/s (for an information bit rate of 80 Kbits/s). This compares favorably with typical ISDN proposals of 320 Kbits/s total bit rate (for an information bit rate of about 144 Kbits/s). As mentioned above, guard time is the period between when one transmitter finishes transmitting a burst and the other transmitter can begin to transmit. Guard time is dependent on propagation delay of the signal over the line, and on line settling time. Propagation delay is dependent on loop length. Line settling time is normally around 5–8 microseconds, but may be longer due to impedance mismatch or bridge taps. The more bits transmitted per burst, the less of a factor guard time is on the effective bit rate, and the lower the required burst frequency. However, a limitation on number of bits per burst is imposed by the need for a high enough sampling rate to maintain voice quality.

The foregoing parameters permit the transmission of at least one voice channel, at least one data channel, and at least one signalling channel along with the synchronization information. Preferably, each burst comprises bits defining at least one voice channel, at least one data channel, and at least one signalling channel, and further contains at least one synchronizing bit at the front and back of each burst. With this arrangement, subscriber locations now capable of only voice communication can readily be provided with voice communication and data communication on existing facilities. In a preferred form of the invention, satisfactory voice and data signal quality can be achieved with two voice channels, a medium speed data channel, and four low speed data channels, all on a single existing subscriber loop.

Whereas in the typical telephone system a large number of subscriber loops exist, some deterioration of signal quality may result as a consequence of a phenomenon known as "far-end crosstalk". In accordance with the invention, the effect of far-end crosstalk is substantially reduced or eliminated by timing the departure of the bursts from each of the subscriber locations such that the bursts transmitted from the subscriber locations for each duplex arrive at the central office substantially simultaneously. Since the distance of the subscriber location from the central office may vary from location to location, and hence the lengths of the subscriber loops may vary, it is therefore necessary to know the length of the subscriber loops. Subscriber loop lengths may be readily determined in any suitable way, such as by transmitting a timed signal through the loop and correlating, with loop length, the delay between its transmission and receipt. In any case, once loop length is determined, the transmitting apparatus at the subscriber location may be adjusted appropriately by adjusting the internal timing unit 18a in accordance with the length of that particular loop so that the burst arrival times at the central office are substantially coincident. The transmit level of the bursts leaving the remote multiplexer units are adjusted so that all bursts received at the central office are at the same level. This approach, combined with simultaneously transmitting all bursts leaving the central office, substantially eliminates crosstalk problems.

Also shown in FIG. 2 is a preferred bit allocation for the bursts 211 and 213. It has been found that this particular bit allocation provides a highly desirable set of services for subscribers without noticeable deterioration in voice quality from that provided by conventional analog service.

More particularly, the preferred bit allocation in the bursts is such as to provide two thirty-two bit voice channels (VA and VB) indicated at 215 and 217, respectively. An additional eight bits are allocated to one eight bit medium speed data channels (MSD) 219. An additional four bits are allocated to four one bit low speed data channels (LS1-LS4) 221. Two signalling bits 223 and 225 are provided. At the beginning of the bursts, five bits collectively shown at 227 are provided for synchronization. A single bit 229 is provided at the end of the burst for synchronization. Thus, synchronizing bits are provided both at the front and back of each burst.

The voice channels preferably use adaptive differential pulse code modulation with a dynamic locking quantizer (ADPCM-DLQ; also referred to as ADPCM) to digitally encode the analog voice signals produced by the subscriber's standard phone set. This algorithm has been adopted by CCITT as the international standard for digital voice transmission, and is currently gaining popularity in the U.S. ADPCM encodes a standard analog voice signal using 8000 4-bit samples per second (8000 times 4 sample bits yields 32000 bits per second, or 32 Kbit/s). Tests have shown that the voice quality produced by ADPCM is comparable to other digital voice-encoding schemes, and very close to the original analog. In terms of voice-band data transmission (the technique employed by modems), ADPCM can support speeds up to 4800 baud. The subscriber perceives little or no change in the quality of voice service supplied by the invention.

The medium speed data channel provides modemless data communications at asynchronous transmission speeds up to 9600 baud. The channels can support an asynchronous data rate that is higher than the 8 Kbit/s synchronous data rate because the synchronous technique strips out the framing bits (start and stop bits) that accompany each byte of asynchronous data. The subscriber's asynchronous data may then be reconstituted at the central office and delivered to a data services vendor interface, such as a packet switching network PAD (packet assembler/disassembler).

As described above, a data set interface (DSI) chip handles all medium speed asynchronous data input/output on the remote multiplexer unit and in the medium speed gateway. The DSI performs the additional function of encoding the asynchronous data into a bit-stuffed synchronous format suitable for transmitting over the medium speed data channel 219. When synchronous medium speed data is to be transmitted to subscriber or vendor interface equipment, the DSI chip restores the data to its asynchronous form.

The medium speed synchronous protocol is important because it reduces the number of bits that must be transmitted, i.e., start and stop bits are not transmitted. It also greatly simplifies the remote multiplexer unit and medium speed gateway by allowing them to use one 8 Kbit channel to transmit and receive medium speed data at any data rate. When there is no medium speed data to transmit over the medium speed channels, a fixed stream of synchronization bits is transmitted.

The low-speed data channels 221 can be used for low-speed data and telemetry applications. These channels provide asynchronous paths for data transmission. The format of the data on these channels may be of any suitable type, and suitable internal encoding of the data, as was done on the medium speed data channel, may be provided if needed. Typically, the low-speed data channels may be wired as dedicated permanent paths to various vendor services, such as:

Intruder detection and control (alarms, lights, etc.)
  Control of machinery and power monitoring (energy management systems, meter reading, etc.)
  Automatic notification of emergency services
  Control and status paths for remote devices Note, however, that with the proper interface equipment, the low-speed data channels may be used for interactive data transmission at asynchronous speeds up to 1200 baud. This allows dedicated, low-speed access to a vendor's specialized network (videotex, lower-speed packet net interface, etc.)

The control and signalling channels 223 and 225 support signals associated with the data and voice channels, and network control commands. For the voice channels, such signals as ring and hook are sent through these paths. In the case of the medium speed data channels, the control and signalling channels may carry information about baud rate, along with the states of relevant RS-232-C dataset signals. These channels also notify the central office of alarm conditions at the subscriber end and control functions at the subscriber end (test and diagnostic routines).

The low-speed data channels allow the subscriber- and vendor-premises equipment to communicate. The remote multiplexer unit accepts low-speed data signals from the subscriber-premises equipment, multiplexes it with voice and medium speed data, and transmits the multiplexed stream to the central office. The components in the central office group the low-speed data by vendor, and deliver that grouped data to the appropriate low-speed data service vendors.

Such data features offer many advantages over present service delivery technology. First, because the low-speed data services are multiplexed with other services (e.g., voice) on existing subscriber loops, the cost to deliver low-speed services is greatly reduced. Second, the central office equipment concentrates the low-speed data from any subscribers onto a single communications line to the vendor, further reducing the cost of service to the vendor. With these cost advantages over current service delivery techniques, the low-speed data services provided by the present invention present a unique opportunity to expand data services in the home and small business environment.

It may be seen, therefore, that the invention provides the ability to greatly increase customer services in the typical telephone system. Voice and data, in multiple channels if desired, are handled expeditiously and with high quality transmission, at distances up to and exceeding six kilometers. The effects of crosstalk and line irregularities are minimized.

In its more general aspects, the invention has broader application than telephone systems. Thus, other types of data transfer systems where TCM full duplex transmission on wires is used between a plurality of remote locations and a central location can often benefit from the invention. This is particularly true when the quality of the electrical connections between the respective remote locations and the central locations is poor. For example, complex computer controlled networks in which data is transferred between a plurality of remote devices and a central monitor, controller, or switch, can utilize the invention to reduce the incidence of spurious signals at the central location.

Various modifications of the invention will become apparent to those skilled in the art from the foregoing description and accompanying drawings. Such modifications are intended to fall within the scope of the appended claims.

What is claimed is:

1. In a telephone system wherein a plurality of subscriber locations are each connected to a central office by a single subscriber loop, a signaling method for transmitting full duplex information between each of the subscriber locations and a central office, said method comprising, transmitting bursts of time compressed multiplexed digital signals at an information bit rate of between about 40 and 80 kilobits per second on the subscriber loops, said transmitting step including transmitting the bursts from the central office to all of the subscriber locations substantially simultaneously with each other, and transmitting the bursts from all of the subscriber locations to the central office such that said bursts arrive at the central office substantially simultaneously with each other.

2. A method according to claim 1 wherein the bursts are transmitted at a burst cycle of between about 0.8 and 4.0 milliseconds.

3. A method according to claim 1 wherein each of said bursts comprises bits defining at least one voice channel, at least one data channel, and at least one signaling channel, and comprising at least one synchronizing bit at the front and back of each said burst.

4. A method according to claim 1 wherein each burst comprises bits defining two voice channels.

5. A method according to claim 1 wherein each burst comprises a plurality of data channels.

6. A method according to claim 1 wherein each burst comprises two voice channels, a medium speed data channel, and four low speed data channels.

7. A method according to claim 1 wherein the bits in each burst are allocated to a plurality of channels, with the number of bits in each channel being at least equal to the minimum required for simulating a hand-wired single channel connection between the subscriber location and the central office for the data assigned to each channel.

8. A method according to claim 1 wherein the amplitude of the bursts transmitted from the subscriber location to the central office is controlled such that the bursts arriving at the central office are of substantially equal aplitude.

9. In a data transfer system wherein a plurality of remote locations are each connected to a central location by a single wired loop respectively, a signaling method for full duplex transmission of information between each remote location and a central location, said method comprising, transmitting bursts of time compressed multiplexed digital signals at an information bit rate of between about 40 and 80 kilobits per second on the wired loops, said transmitting step including transmitting the bursts directed from the central location to all of the remote locations substantially simultaneously with each other, and transmitting the bursts from all of the remote locations to the central location such that said bursts arrive at the central location substantially simultaneously with each other.

10. A method according to claim 9 wherein the amplitude of the bursts transmitted from the subscriber location to the central office is controlled such that the bursts arriving at the central office are of substantially equal amplitude.

* * * * *